United States Patent
Gharpure et al.

(10) Patent No.: US 8,386,845 B1
(45) Date of Patent: Feb. 26, 2013

(54) TECHNIQUES FOR PROVIDING INSTANT DISASTER RECOVERY

(75) Inventors: Geeta Gharpure, Sunnyvale, CA (US); Tahur Mansur Vohra, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 325 days.

(21) Appl. No.: 12/897,245

(22) Filed: Oct. 4, 2010

(51) Int. Cl.
*G06F 11/00* (2006.01)

(52) U.S. Cl. .............................. 714/13; 714/2

(58) Field of Classification Search ................ 714/2, 13, 714/4.11, 11, 12, 15, 16, 20, 36, 723
See application file for complete search history.

(56) References Cited

U.S. PATENT DOCUMENTS

| | | | | |
|---|---|---|---|---|
| 6,957,221 | B1 * | 10/2005 | Hart et al. | 1/1 |
| 7,051,052 | B1 * | 5/2006 | Shapiro et al. | 707/610 |
| 7,433,903 | B1 * | 10/2008 | Shapiro et al. | 1/1 |
| 7,457,982 | B2 | 11/2008 | Rajan | |
| 7,770,057 | B1 * | 8/2010 | Graham et al. | 714/6.12 |
| 8,200,527 | B1 * | 6/2012 | Thompson et al. | 705/7.39 |
| 2008/0256141 | A1 | 10/2008 | Wayda et al. | |

OTHER PUBLICATIONS

FalconStor Web Page, retrieved from the Internet at: http://www.falconstor.com, 1 page, Jan. 24, 2011.
Scaledata Web Page, retrieved from the Internet at: http://www.scaledata.com, 1 page, Jan. 24, 2011.
Wind River Web Page, retrieved from the Internet at: http://www.Isi.com/DistributionSystem/AssetDocument/documentation/storage/software/ESG_Instant_DR_For_MS_SQL-Exch_WP_110507.pdf, Jan. 24, 2011.

* cited by examiner

*Primary Examiner* — Dieu-Minh Le
(74) *Attorney, Agent, or Firm* — Wilmer Cutler Pickering Hale and Dorr LLP (57) ABSTRACT

Techniques for providing instant disaster recovery are disclosed. In one particular exemplary embodiment, the techniques may be realized as a method for providing instant disaster recovery comprising, maintaining, in a data store, data associated with a first host system, wherein the data comprises a first data portion and a second data portion, storing, in the first data portion, a disaster recovery agent, and exposing, to a second host system, the first data portion and the second data portion, wherein the disaster recovery agent is configured to initiate, on the second host system, a disaster recovery process, boot the second host system using the first data portion, and copy, from the data store, the second data portion in accordance with a first copy procedure and a second copy procedure.

21 Claims, 7 Drawing Sheets

TECHNIQUES FOR PROVIDING INSTANT DISASTER RECOVERY

FIELD OF THE DISCLOSURE

The present disclosure relates generally to disaster recovery and, more particularly, to techniques for providing instant disaster recovery.

BACKGROUND OF THE DISCLOSURE

Disaster recovery procedures are essential to an organization's ability to maintain business continuity. The efficiency of these disaster recovery procedures often dictates the amount of time a system will remain offline after a disaster has occurred (e.g., natural system failure, induced system failure). That is, efficient disaster recovery procedures may significantly reduce the amount of time a failed system remains inoperable. Many disaster recovery procedures currently used, however, are inefficient and need a substantial amount of recovery time.

In view of the foregoing, it may be understood that there may be significant problems and shortcomings associated with current technologies for disaster recovery.

SUMMARY OF THE DISCLOSURE

Techniques for providing instant disaster recovery are disclosed. In one particular exemplary embodiment, the techniques may be realized as a method for providing instant disaster recovery comprising maintaining, in a data store, data associated with a first host system, wherein the data comprises a first data portion and a second data portion, storing, in the first data portion, a disaster recovery agent, and exposing, to a second host system, the first data portion and the second data portion, wherein the disaster recovery agent is configured to initiate, on the second host system, a disaster recovery process, boot the second host system using the first data portion, and copy, from the data store, the second data portion in accordance with a first copy procedure and a second copy procedure.

In accordance with other aspects of this particular exemplary embodiment, the data store may comprise one or more snap shot logical unit numbers (LUNs).

In accordance with further aspects of this particular exemplary embodiment, the first data portion may comprise one or more boot logical unit numbers (LUNs).

In accordance with additional aspects of this particular exemplary embodiment, the second data portion may comprise one or more data logical unit numbers (LUNs).

In accordance with other aspects of this particular exemplary embodiment, the data associated with the first host system may comprise a data image of the first host system at a point in time.

In accordance with further aspects of this particular exemplary embodiment, the exposing may comprise exposing, to the second host system, a data image associated with the first data portion and a data image associated with the second data portion.

In accordance with additional aspects of this particular exemplary embodiment, the first copy procedure may comprise a thin copy procedure.

In accordance with other aspects of this particular exemplary embodiment, the thin copy procedure may further comprise copying the second data portion based on an optimization of input and output patterns.

In accordance with further aspects of this particular exemplary embodiment, the thin copy procedure may further comprise directing a read request for copied data to the second host system.

In accordance with additional aspects of this particular exemplary embodiment, the thin copy procedure may further comprise directing a read request for not copied data to the data store on an appliance.

In accordance with other aspects of this particular exemplary embodiment, the second copy procedure may comprise a thick copy procedure.

In accordance with further aspects of this particular exemplary embodiment, the thick copy procedure may further comprise copying the second data portion sequentially.

In accordance with additional aspects of this particular exemplary embodiment, the thick copy procedure may further comprise accessing a bit map of copied data and not copied data.

In accordance with other aspects of this particular exemplary embodiment, the first copy procedure and the second copy procedure may be performed simultaneously.

In accordance with further aspects of this particular exemplary embodiment, the disaster recovery agent may be further configured to direct all write requests to the second host system.

In accordance with additional aspects of this particular exemplary embodiment, the first host system may comprise a system on which a disaster has occurred.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process.

In another particular exemplary embodiment, the techniques may be realized as an article of manufacture for providing instant disaster recovery, the article of manufacture comprising at least one non-transitory processor readable medium, and instructions stored on the at least one medium, wherein the instructions are configured to be readable from the at least one medium by at least one processor and thereby cause the at least one processor to operate so as to maintain, in a data store, data associated with a first host system, wherein the data comprises a first data portion and a second data portion, store, in the first data portion, a disaster recovery agent, and expose, to a second host system, the first data portion and the second data portion, wherein the disaster recovery agent is configured to initiate, on the second host system, a disaster recovery process, boot the second host system using the first data portion, and copy, from the data store, the second data portion in accordance with a first copy procedure and a second copy procedure.

In another particular exemplary embodiment, the techniques may be realized as a system for providing instant disaster recovery comprising one or more processors communicatively coupled to a network, wherein the one or more processors are configured to maintain, in a data store on, data associated with a first host system, wherein the data comprises a first data portion and a second data portion, store, in the first data portion, a disaster recovery agent, and expose, to a second host system, the first data portion and the second data portion, wherein the disaster recovery agent is configured to initiate, on the second host system, a disaster recovery process, boot the second host system using the first data portion, and copy, from the data store, the second data portion in accordance with a first copy procedure and a second copy procedure.

In another particular exemplary embodiment, the techniques may be realized as a method for providing instant disaster recovery comprising initiating, on a second host system, a disaster recovery process by accessing data associated with a first host system, wherein the data comprises a first data portion and a second data portion, booting the second host system using the first data portion, and copying, from a data store, the second data portion in accordance with a first copy procedure and a second copy procedure.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Current disaster recovery techniques may include creating and maintaining a snapshot (e.g., an image of data at a particular point-in-time) of data associated with an original system (e.g., an original application host system, an original server system, an original client system) on an appliance (e.g., a replication appliance) that is connected (e.g., communicatively coupled) to the original system. In the event a disaster (e.g., a complete system failure) occurs on the original system, a new system may be configured to replace the original system that has failed by handling the production workload of the original system. In such a case, the new system may access the snapshot associated with the original system on the appliance. Since many snapshots have limited write space, however, the new system may not be able to handle the production workload until the data associated with the snapshot is copied onto a new storage medium. Such copying further increases the amount of time the new system remains unable to handle the production workload of the original system.

In one embodiment, techniques for providing instant disaster recovery are provided. In such an embodiment, an appliance may include a data store (e.g., snapshot logical unit number (LUN)) that is configured to store a data image (e.g., snapshots) associated with an original system that is connected (e.g., communicatively coupled) to the appliance. The snapshot LUN may include any, or a combination, of a boot LUN from which a new system may boot and a data LUN. The boot LUN of the snapshot LUN may include a disaster recovery agent (e.g., a driver) that is configured to initiate a disaster recovery process.

The snapshot LUN may be exposed to a new system (e.g., bare metal hardware) in the event a disaster occurs on the original system. In such an embodiment, the disaster recovery agent stored in the boot LUN may initiate a disaster recovery process on the new system. As a result, the new system may be instantly (e.g., the minimal amount of time needed to initiate the disaster recovery process and a thin copy procedure on the new system) configured to replace the original system and handle the production workload (or a substantial portion of the production workload) of the original system.

As referred to herein, a LUN may be any mechanism or device used to store, access, or identify data. For example, a LUN may include an identifier that indicates a location of a data store (e.g., storage volume). In another example, a LUN may store or contain data. In yet another example, a LUN may include a virtual data store.

Figure 1:
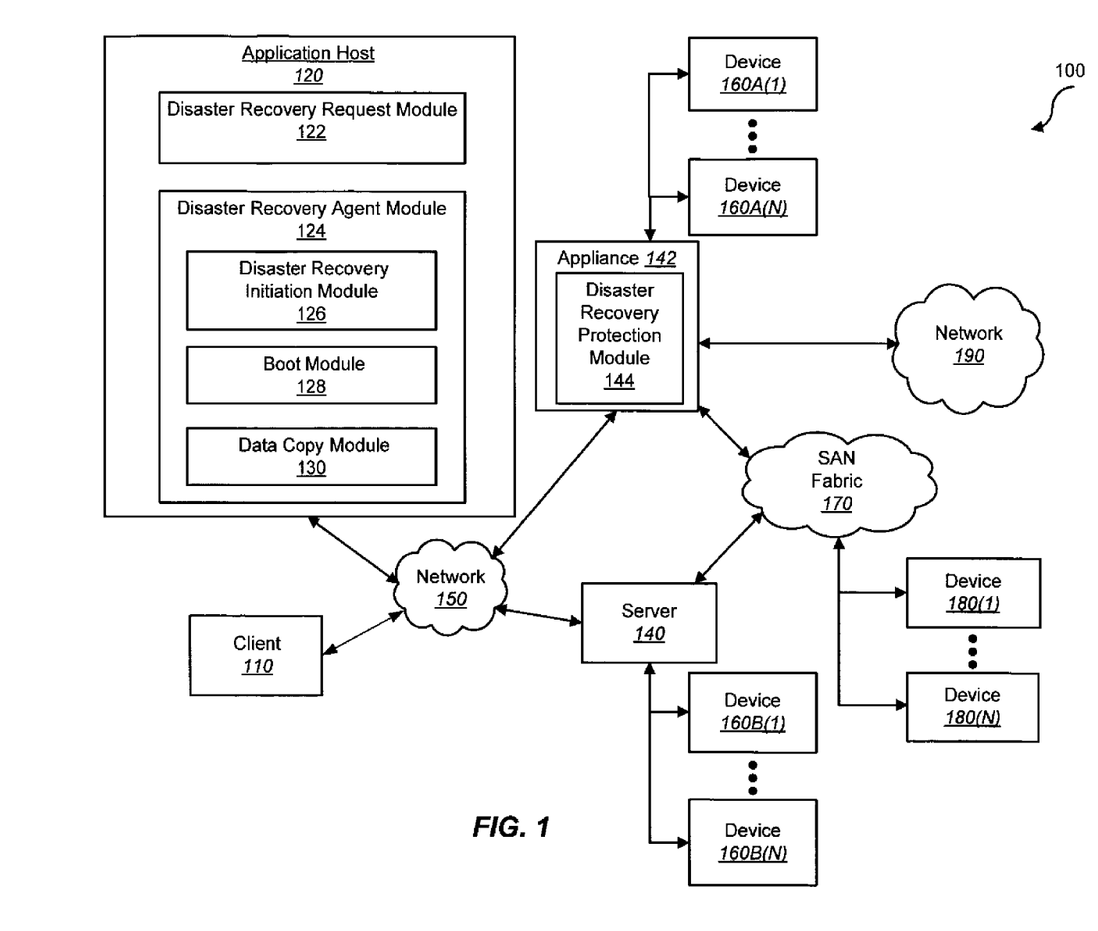
FIG. 1 shows a block diagram depicting a network architecture containing a platform for providing instant disaster recovery in accordance with an embodiment of the present disclosure.

FIG. 1 shows a block diagram depicting a network architecture 100 for providing instant disaster recovery in accordance with an embodiment of the present disclosure. FIG. 1 is a simplified view of network architecture 100, which may include additional elements that are not depicted. Network architecture 100 may contain client 110, application host 120, appliance 142, as well as server 140 (one or more of which may be implemented using computer system 200 shown in FIG. 2). Client 110 and application host 120 may be communicatively coupled to a network 150. Appliance 142 may be communicatively coupled to storage devices 160A(1)-(N), and server 140 may be communicatively coupled to storage devices 160B(1)-(N). Appliance 142 may contain a disaster recovery module (e.g., a disaster recovery protection module 144 of appliance 142).

Appliance 142 and server 140 may be communicatively coupled to a SAN (Storage Area Network) fabric 170. SAN fabric 170 may support access to storage devices 180(1)-(N) by appliance 142 and servers 140, and by client system 110 and application host 120 via network 150. Appliance 142 may be communicatively coupled to network 190. Application host 120 may contain one or more modules for providing instant disaster recovery including disaster recovery request module 122 and disaster recovery agent module 124. Disaster recovery agent module 124 may contain one or more additional modules for providing instant disaster recovery including disaster recovery initiation module 126, boot module 128, and data copy module 130.

Figure 2:
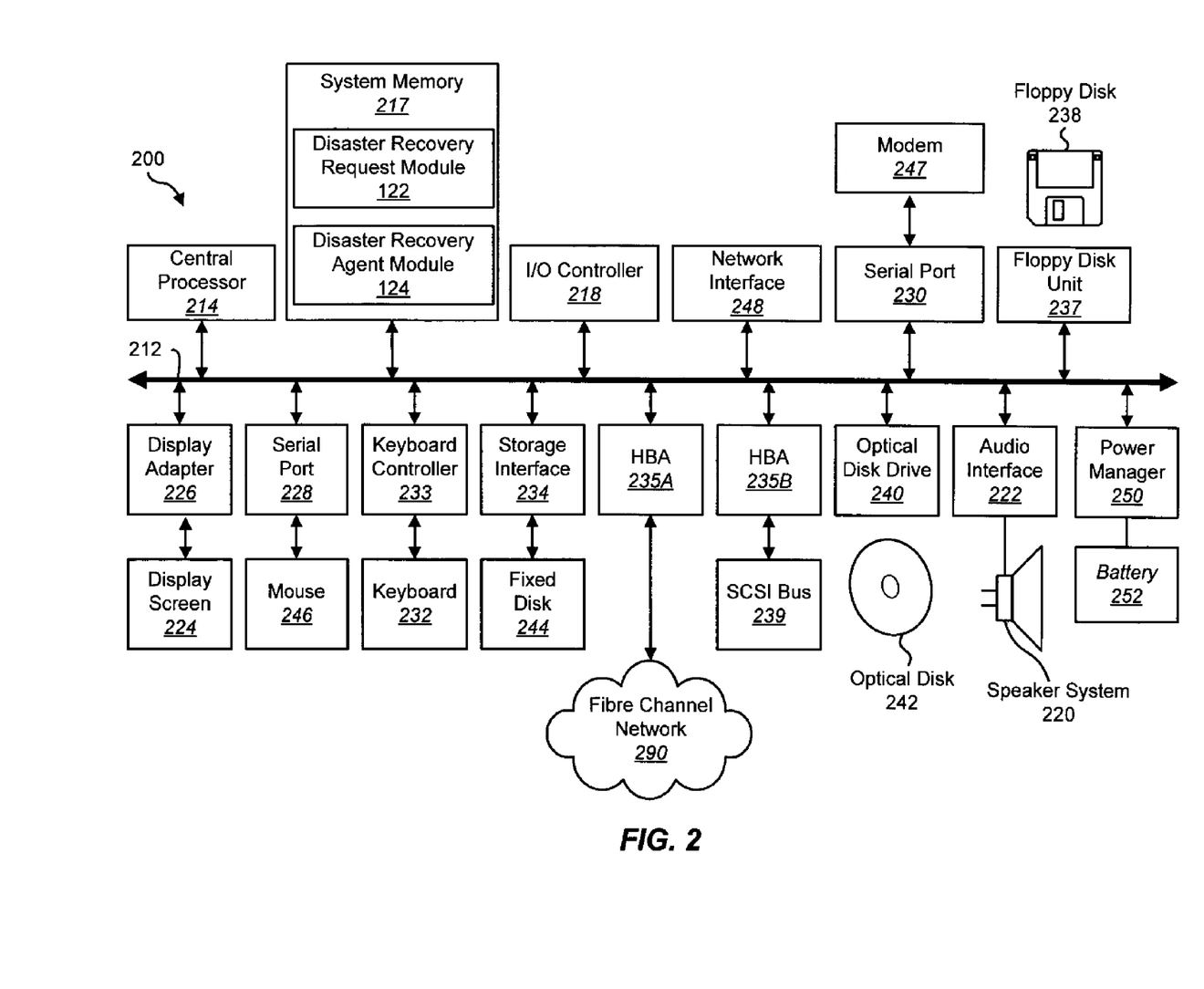
FIG. 2 depicts a block diagram of a computer system in accordance with an embodiment of the present disclosure.

With reference to computer system 200 of FIG. 2, modem 247, network interface 248, or some other method may be used to provide connectivity from one or more of application host 120 to network 150. Application host 120 may be able to access information on appliance 142 or server 140 using, for example, a web browser or other client software. Such a client may allow application host 120 to access data hosted by appliance 142 or server 140 or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, application host 120, appliance 142, server 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients, application hosts, appliances, or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to appliance 142 or server 140. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup, replication, or archival purposes.

According to some embodiments, client 110 may be a smartphone, PDA, desktop computer, a laptop computer, a server, another computer, or another device coupled via a wireless or wired connection to network 150. Client 110 may receive data from user input, a database, a file, a web service, and/or an application programming interface.

Application host 120, appliance 142, and server 140 may be application servers, archival platforms, backup servers, network storage devices, media servers, email servers, document management platforms, enterprise search servers, or other devices communicatively coupled to network 150. Appliance 142 and server 140 may utilize one of storage devices 160A(1)-(N), 160B(1)-(N), and/or 180(1)-(N) for the storage of application data, replication data, backup data, or other data. Application host 120, appliance 142, and server 140 may be hosts, such as an application server, which may process data traveling between client 110 and a backup platform, a backup process, and/or storage. According to some embodiments, application host 120, appliance 142, and server 140 may be platforms used for backing up and/or archiving data.

Disaster recovery protection module 144, disaster recovery request module 122, and disaster recovery agent module 124 are discussed in further detail below.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, disaster recovery request module 122 and disaster recovery agent module 124 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3A:
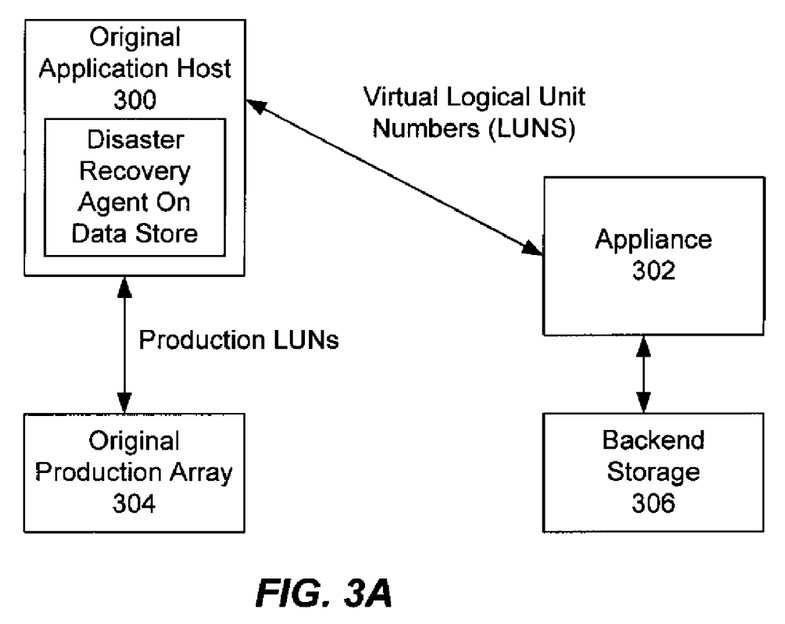
FIG. 3A shows a block diagram of an original production in accordance with an embodiment of the present disclosure.

Referring to FIG. 3A, there is shown a block diagram of an original production in accordance with an embodiment of the present disclosure. As previously described, prior to the occurrence of a disaster, an original application host 300 may be configured to handle a production workload that includes managing read requests and write requests from one or more client systems. Based on the read requests and write requests received, the original application host 300 may access an original production array 304 (e.g., to read data and write data) using one or more production LUNs. Original production array 304 may include one or more storage devices that utilize any, or a combination, of a redundant array of inexpensive disks ("RAID"), magnetic tape, disk, a storage area network ("SAN"), an Internet small computer systems interface ("iSCSI") SAN, a Fibre Channel SAN, a common Internet File System ("CIFS"), network attached storage ("NAS"), a network file system ("NFS"), optical based storage, and other computer accessible storage. Original production array 304 may be configured to store production data associated with a production workload.

Original application host 300 may be connected (e.g., communicatively coupled) to an appliance 302 (e.g., a replication appliance). The original application host 300 may contain and store a pre-installed disaster recovery agent. During normal operation of the original application host 302, the appliance 302 may create and store a snapshot (associated with a snapshot LUN) of the data associated with the original application host 300 at a particular point-in-time (including the disaster recovery agent). That is, the appliance 302 may create and store a snapshot of boot data and production data associated with the original application host 300. In one embodiment, the appliance 302 may create and store a snapshot (associated with a snapshot LUN) of the data stored in the original production array 304 at a particular point-in-time.

A snapshot LUN may include one or more boot LUNs and one or more data LUNs. The appliance 302 may store a disaster recovery agent configured to initiate a disaster recovery process in at least one boot LUN of the snapshot LUN. The appliance 302 may also journal the changes to the data associated with the original application host 300 from the point-in-time a snapshot is created.

Appliance 302 may be connected (e.g., communicatively coupled) to a backend storage 306. Backend storage 306 may include one or more storage devices that utilize any, or a combination, of a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, and other computer accessible storage. Backend storage 306 may store one or more snapshots (and snapshot LUNs) created by the appliance 302 and journal data.

Figure 3B:
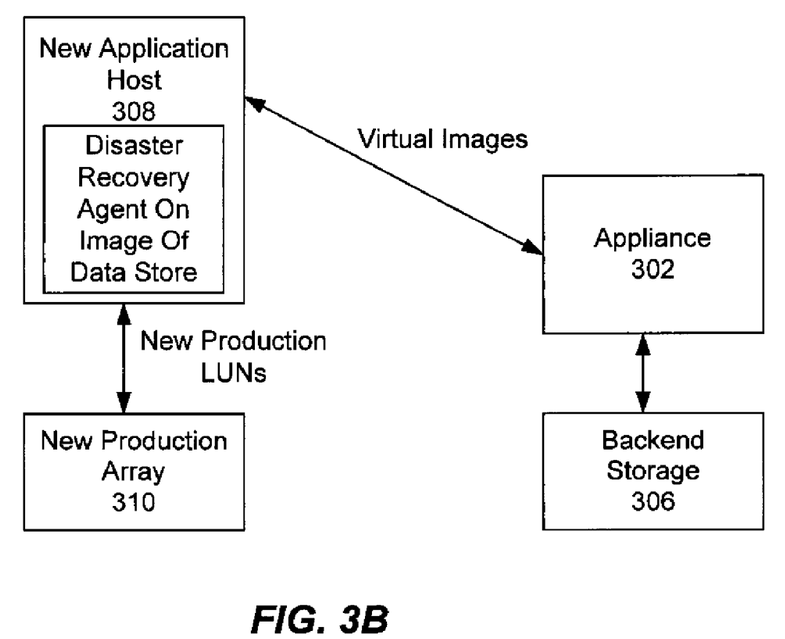
FIG. 3B shows a block diagram of a recovery production in accordance with an embodiment of the present disclosure.

Referring to FIG. 3B, there is shown block diagram of a recovery production in accordance with an embodiment of the present disclosure. As previously described, after a disaster (e.g., complete system failure) has occurred on the original application host 300, a new application host 308 may be configured to replace the original application host 300 and handle the production workload of the original application host 300.

New application host 302 may be connected (e.g., communicatively coupled) to the appliance 302 in which the one or more snapshots (and snapshot LUNs) associated with the original application host 300 are stored. New application host 302 may request recovery to a particular point-in-time. In response to the request, appliance 302 may expose the snapshot LUN of the original host system 300 that corresponds to the requested point-in-time to the new application host 308. The disaster recovery agent located in the boot LUN of the snapshot LUN may then initiate a disaster recovery process on the new application host 308. In accordance with the disaster recovery process, the new application host 308 may be booted from the boot LUN and data from the boot LUN and data LUN may be accessed and copied to new production array 310.

New production array 310 may include one or more storage devices that utilize any, or a combination, of a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, and other computer accessible storage.

The data from the boot LUN and data LUN may be copied to the new production array 300 in accordance with a thin copy procedure and a thick copy procedure. The thin copy procedure may select portions of the data to be copied first based on an optimization of input and output patterns associated with the original application host 300. The thick copy procedure may copy all remaining data sequentially. The functions of the disaster recovery agent are described in further detail below.

Figure 4:
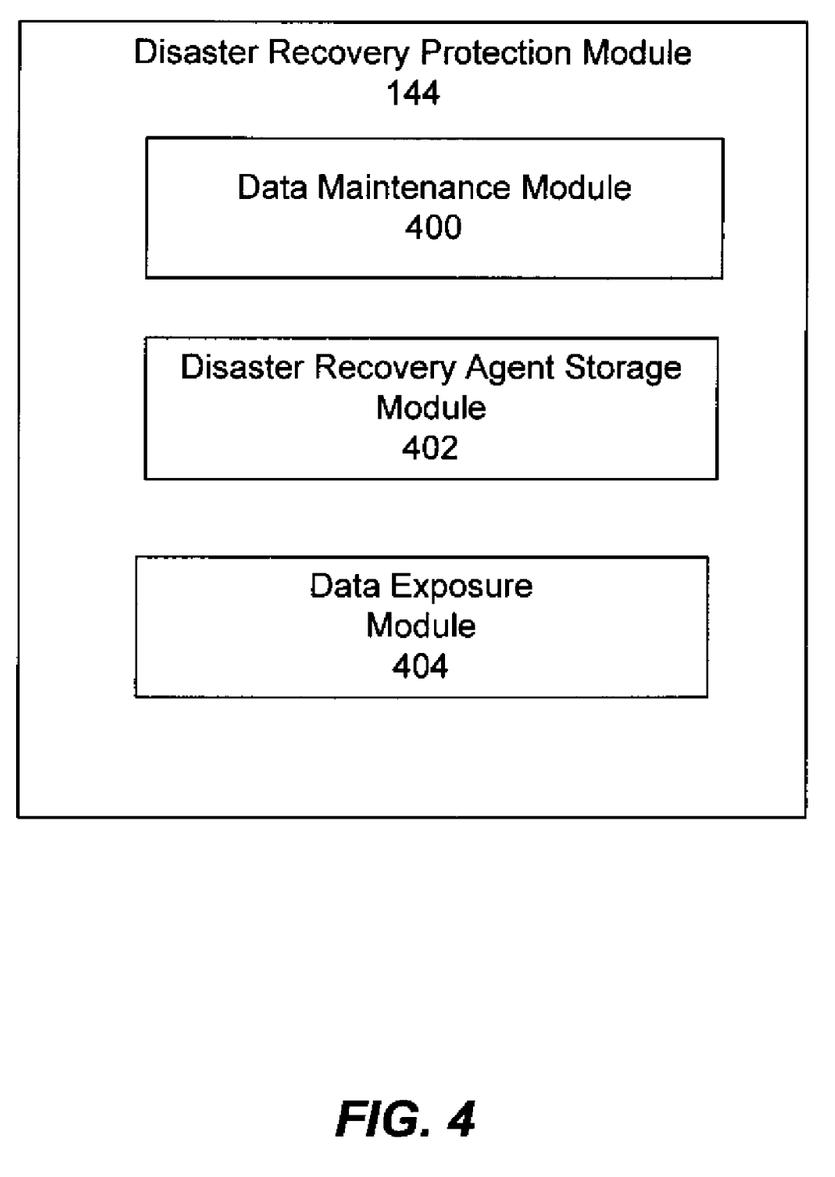
FIG. 4 shows a module for providing instant disaster recovery in accordance with an embodiment of the present disclosure.

Referring to FIG. 4, there is shown a disaster recovery protection module 144 in accordance with an embodiment of the present disclosure. As illustrated, the disaster recovery protection module 144 may contain one or more components including a data maintenance module 400, a disaster recovery agent storage module 402, and a data exposure module 404.

The description below describes network elements, computers, and/or components of a system and method for providing instant disaster recovery that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Data maintenance module 400 may be configured to create and store one or more snapshots (and one or more snapshot LUNs) of data associated with an original application host (e.g., original application host 300) at particular points-in-time in one or more data stores. A snapshot LUN may include one or more boot LUNs (associated with boot data) and one or more data LUNs (associated with production data). Data maintenance module 400 may also be configured to record and store journal data that indicates data changes in a snapshot from the point-in-time at which the snapshot was created using one or more continuous data protection (CDP) techniques. In one embodiment, data maintenance module 400 may store one or more snapshots (and snapshot LUNs) and journal data in a backend storage (e.g., backend storage 306).

Disaster recovery agent storage module 402 may be configured to store a disaster recovery agent in one or more boot LUNs of one or more snapshot LUNs. Disaster recovery agent storage module 402 may also be configured to initiate disaster recovery protection on a boot LUN of a snapshot LUN. In one embodiment, the disaster recovery protection may be initiated on the boot LUN in response to input from a user (e.g., system administrator, network administrator).

Data exposure module 404 may be configured to receive and process a request for disaster recovery to a particular point-in-time from a new application host. Based on the request, data exposure module 404 may expose a snapshot LUN associated with the data of an original application host at the requested recovery time to a new application host being configured to replace the original application host.

Figure 5:
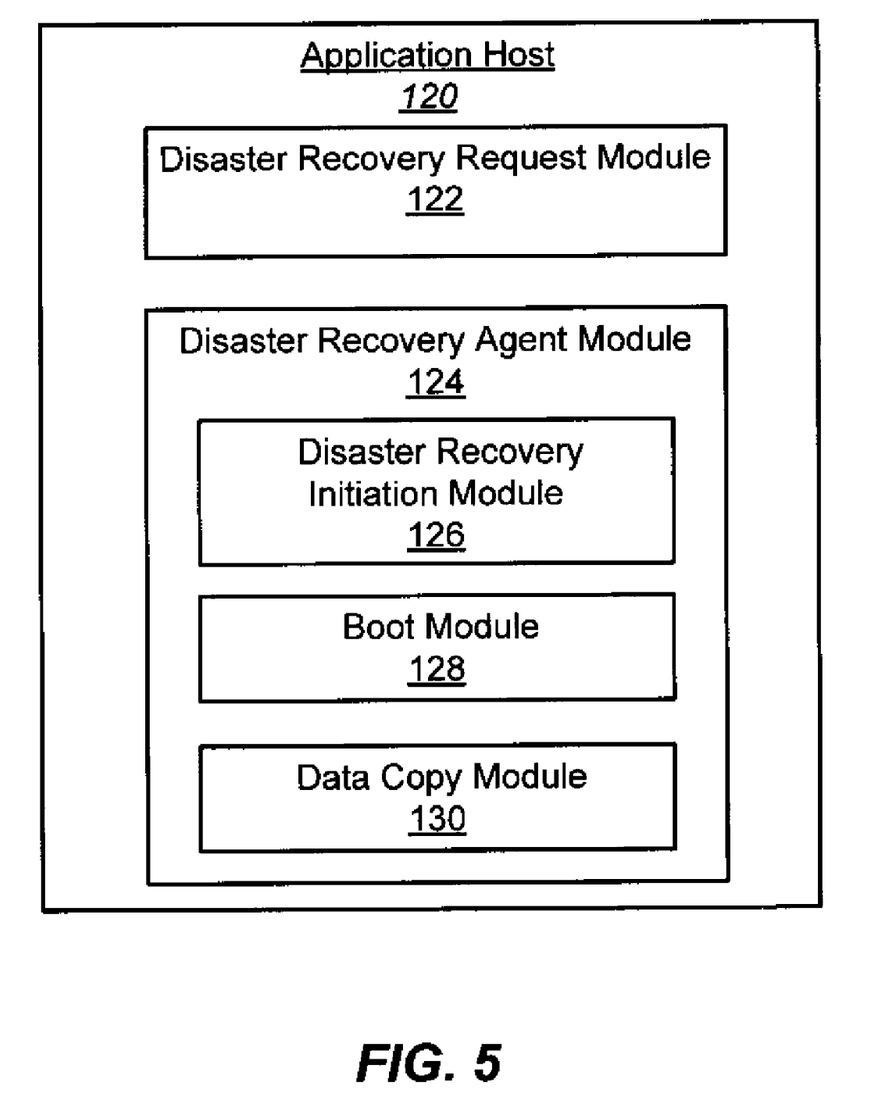
FIG. 5 shows modules of an application host in accordance with an embodiment of the present disclosure.

Referring to FIG. 5, there is shown modules of an application host 120 in accordance with an embodiment of the present disclosure. As illustrated, the application host 120 may contain one or more components including a disaster recovery request module 122 and a disaster recovery agent module 124. The disaster recovery agent module 124 may contain one or more components including a disaster recovery initiation module 126, a boot module 128, and a data copy module 130.

The description below describes network elements, computers, and/or components of a system and method for providing instant disaster recovery that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Disaster recovery request module 122 may be configured to create and send a request (e.g., an appliance request) to be recovered to a particular point-in-time to an appliance (e.g., appliance 142, appliance 302). In response to the request, a snapshot LUN (including a boot LUN and a data LUN) associated with the requested recovery time may be exposed to application host 120. The disaster recovery agent stored in the boot LUN may be accessed and a disaster recovery process may be initiated on application host 120.

Disaster recovery agent module 124 may be configured store the disaster recovery agent that is configured to initiate and perform the disaster recovery process on application host 120. The steps of the disaster recovery process as performed by the disaster recovery agent are described with reference to the disaster recovery initiation module 126, the boot module 128, and the data copy module 130.

Disaster recovery initiation module 126 may be configured to initiate a disaster recovery process in the application host 120. The disaster recovery initiation module 126 may automatically initiate the disaster recovery process once the disaster recovery agent is stored on the application host 120. That is, the disaster recovery agent may detect its association with the snapshot LUN and automatically trigger the initiation of the disaster recovery process on the application host 120.

Boot module 128 may be configured to boot the application host 120 from the boot LUN exposed to the application host 120. The boot LUN may provide access to the boot data necessary to boot up the application host 120 and start one or more operating systems.

Data copy module 130 may be configured to copy data from the boot LUN and the data LUN to one or more storage devices (e.g., a production array) on or accessible to the application host 120. The data copy module 130 may copy the data from the boot LUN and the data LUN in accordance with a thin copy procedure and a thick copy procedure.

The thin copy procedure may select optimal portions (e.g., blocks) of the data to be copied first based on a map of input and output patterns and a file map of the snapshot LUN. For example, the data copy module 130 may consider portions of data that are frequently accessed by one or more client computers to be "hot" data portions. Accordingly, the data copy module 130 may prioritize the copying of one or more "hot" data portions to the application host 120 first. In another example, the data copy module 130 may consider portions of data that are infrequently accessed by the one or more client computers to be "cold" data portions. Accordingly, the data copy module 130 may prioritize the copying of one or more "cold" data portions to the application host 120 after the copying of the one or more "hot" data portions. Data copy module 130 may also be configured to maintain a bit map of the data portions that have been copied and the data portions that have not been copied.

Once the thin copy procedure has been initiated, the application host 120 may be considered to be online. Accordingly, the application host 120 may begin to receive read requests and write requests from one or more client computers connected (e.g., communicatively coupled) to the application host 120.

After receipt of a read request, the data copy module 130 may determine whether the data requested in the read request has been copied to the application host 120 by accessing the bit map. If, for example, the read request is requesting data that has been copied to the application host 120, the data copy module 130 may direct the read request to the data on the application host 120. If, however, the read request is requesting data that has not been copied to the application host 120, the data copy module 130 may direct the read request to the data on an appliance. The data copy module 130 may direct all write requests to the application host 120.

While the thin copy procedure is being performed, the thick copy procedure may copy one or more of the remaining portions of the data sequentially based on the bit map and the file map. In one embodiment, the thick copy procedure may copy the portions of data that have not been to which data has not been written. In another embodiment, the thick copy procedure may not copy one or more temporary files. It should be noted that the thin copy procedure or the thick copy procedure may be performed by appliance (instead of the disaster recovery agent).

Figure 6:
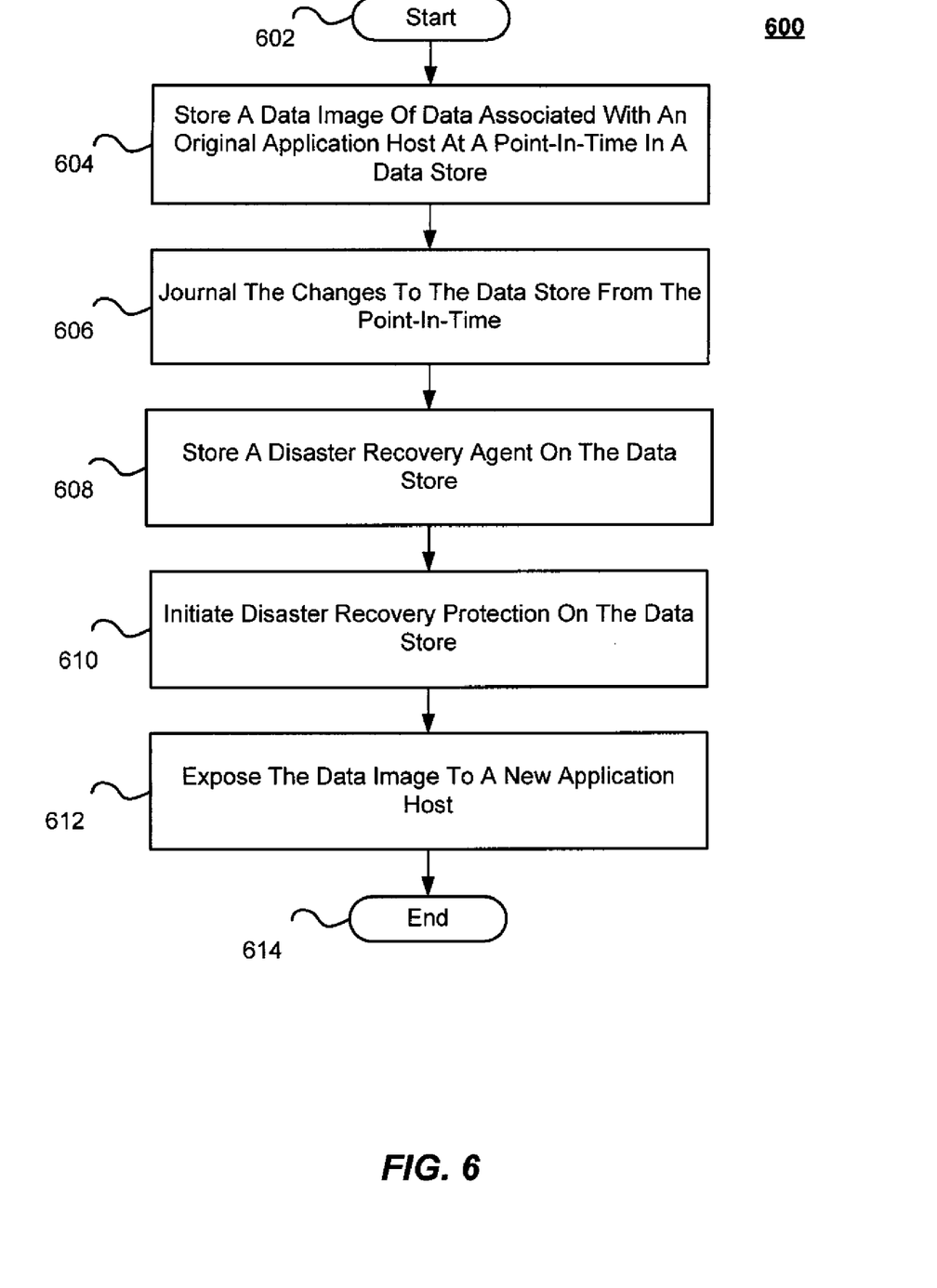
FIG. 6 depicts a method for providing instant disaster recovery in accordance with an embodiment of the present disclosure.

Referring to FIG. 6, there is depicted a method 600 for providing instant disaster recovery in accordance with an embodiment of the present disclosure. At block 602, the method 600 may begin.

At block 604, a data image of data associated with an original application host created at a particular point-in-time may be stored in a data store. The data image may include a snapshot that is associated with a snapshot LUN. The snapshot LUN may include one or more boot LUNs and one or more data LUNs. The data store may reside on or be accessible to an appliance (e.g., replication appliance).

At block 606, the changes to the data store may be journaled from the point-in-time the data image was created. The changes may be recorded and stored using one or more continuous data protection (CDP) techniques.

At block 608, a disaster recovery agent may be stored on the data store. The disaster recovery agent may be stored in a boot LUN of the snapshot LUN.

At block 610, disaster recovery protection may be initiated on the data store. In one embodiment, disaster recovery protection may be initiated on the boot LUN of the snapshot LUN.

At block 612, the data image may be exposed to a new application host. The new application host may be configured to replace the original application host and handle the production workload of the original application host.

At block 614, the method 600 may end.

Figure 7:
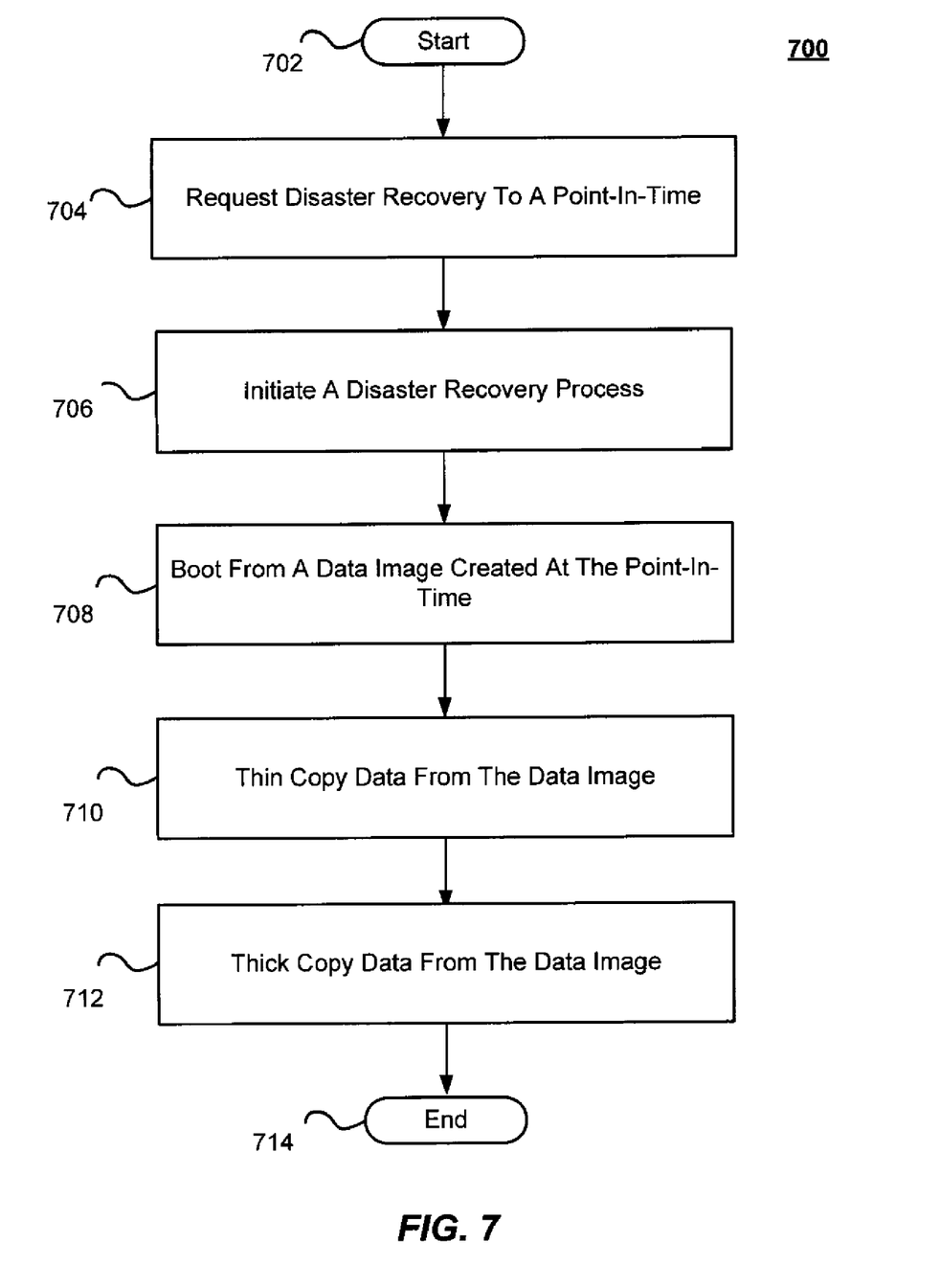
FIG. 7 depicts another method for providing instant disaster recovery in accordance with an embodiment of the present disclosure.

Referring to FIG. 7, there is depicted another method 700 for providing instant disaster recovery in accordance with an embodiment of the present disclosure. At block 702, the method 700 may begin.

At block 704, disaster recovery may be requested to a point-in-time. In one embodiment, a new application host that is being configured to replace an original application host may send a request for disaster recovery to a particular point-in-time to an appliance (e.g., replication appliance).

At block 706, a disaster recovery process may be initiated. In one embodiment, the new application host may be exposed to a snapshot LUN corresponding to the requested recovery time in response to the request for disaster recovery. After the exposure, the new application host may contain a disaster recovery agent that is configured to automatically trigger the disaster recovery process.

At block 708, a new application host may boot from a data image created at the point-in-time. In one embodiment, the new application host may boot from a boot LUN of a snapshot LUN.

At block 710, data from the data image may be thin copied. In one embodiment, a thin copy procedure may select optimal portions (e.g., blocks) of the data to be copied first based on a map of input and output patterns and a file map of the snapshot LUN. The new application host may be considered to be online once a thin copy procedure has been initiated.

At block 712, data from the data image may be thick copied. In one embodiment, a thick copy procedure may copy one or more of the remaining portions of the data sequentially based on a bit map of copied data and not copied data and a file map.

At block 714, the method 700 may end.

At this point it should be noted that providing instant disaster recovery in accordance with the present disclosure as described above typically involves the processing of input data and the generation of output data to some extent. This input data processing and output data generation may be implemented in hardware or software. For example, specific electronic components may be employed in a disaster recovery protection module or similar or related circuitry for implementing the functions associated with providing instant disaster recovery in accordance with the present disclosure as described above. Alternatively, one or more processors operating in accordance with instructions may implement the functions associated with providing instant disaster recovery in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for providing instant disaster recovery comprising:
    maintaining, in a data store, data associated with a first host system, wherein the data comprises a first data portion and a second data portion;
    storing, in the first data portion, a disaster recovery agent; and
    exposing, to a second host system, the first data portion and the second data portion, wherein the disaster recovery agent is configured to:
        initiate, on the second host system, a disaster recovery process;
        boot the second host system using the first data portion; and
        copy, from the data store, the second data portion in accordance with a first copy procedure and a second copy procedure.

2. The method of claim 1, wherein the data store comprises one or more snap shot logical unit numbers (LUNs).

3. The method of claim 1, wherein the first data portion comprises one or more boot logical unit numbers (LUNs).

4. The method of claim 1, wherein the second data portion comprises one or more data logical unit numbers (LUNs).

5. The method of claim 1, wherein the data associated with the first host system comprises a data image of the first host system at a point in time.

6. The method of claim 1, wherein the exposing comprises exposing, to the second host system, a data image associated with the first data portion and a data image associated with the second data portion.

7. The method of claim 1, wherein the first copy procedure comprises a thin copy procedure.

8. The method of claim 7, wherein the thin copy procedure further comprises copying the second data portion based on an optimization of input and output patterns.

9. The method of claim 7, wherein the thin copy procedure further comprises directing a read request for copied data to the second host system.

10. The method of claim 7, wherein the thin copy procedure further comprises directing a read request for not copied data to the data store on an appliance.

11. The method of claim 1, wherein the second copy procedure comprises a thick copy procedure.

12. The method of claim 11, wherein the thick copy procedure further comprises copying the second data portion sequentially.

13. The method of claim 11, wherein the thick copy procedure further comprises accessing a bit map of copied data and not copied data.

14. The method of claim 1, wherein the first copy procedure and the second copy procedure are performed simultaneously.

15. The method of claim 1, wherein the disaster recovery agent is further configured to direct all write requests to the second host system.

16. The method of claim 1, wherein the first host system and the second host system comprise application host systems.

17. The method of claim 1, wherein the first host system comprises a system on which a disaster has occurred.

18. At least one non-transitory processor readable storage medium for storing a computer program of instructions configured to be readable by at least one processor for instructing the at least one processor to execute a computer process for performing the method as recited in claim 1.

19. An article of manufacture for providing instant disaster recovery, the article of manufacture comprising:
   at least one non-transitory processor readable medium; and
   instructions stored on the at least one medium;
   wherein the instructions are configured to be readable from the at least one medium by at least one processor and thereby cause the at least one processor to operate so as to:
      maintain, in a data store, data associated with a first host system, wherein the data comprises a first data portion and a second data portion;
      store, in the first data portion, a disaster recovery agent; and
      expose, to a second host system, the first data portion and the second data portion, wherein the disaster recovery agent is configured to:
         initiate, on the second host system, a disaster recovery process;
         boot the second host system using the first data portion; and
         copy, from the data store, the second data portion in accordance with a first copy procedure and a second copy procedure.

20. A system for providing instant disaster recovery comprising:
   one or more processors communicatively coupled to a network; wherein the one or more processors are configured to:
      maintain, in a data store on, data associated with a first host system, wherein the data comprises a first data portion and a second data portion;
      store, in the first data portion, a disaster recovery agent; and
      expose, to a second host system, the first data portion and the second data portion, wherein the disaster recovery agent is configured to:
         initiate, on the second host system, a disaster recovery process;
         boot the second host system using the first data portion; and
         copy, from the data store, the second data portion in accordance with a first copy procedure and a second copy procedure.

21. A method for providing instant disaster recovery comprising:
   initiating, on a second host system, a disaster recovery process by accessing data associated with a first host system, wherein the data comprises a first data portion and a second data portion;
   booting the second host system using the first data portion; and
   copying, from a data store, the second data portion in accordance with a first copy procedure and a second copy procedure.

* * * * *

UNITED STATES PATENT AND TRADEMARK OFFICE
CERTIFICATE OF CORRECTION

PATENT NO. : 8,386,845 B1  
APPLICATION NO. : 12/897245  
DATED : February 26, 2013  
INVENTOR(S) : Geeta Gharpure et al.

Page 1 of 1

It is certified that error appears in the above-identified patent and that said Letters Patent is hereby corrected as shown below:

On the Title page of the patent:

(75) Inventors should read: ~~Tahur~~ Taher Mansur Vohra, Sunnyvale, CA

Signed and Sealed this  
Twenty-fifth Day of June, 2013

Teresa Stanek Rea  
*Acting Director of the United States Patent and Trademark Office*